United States Patent [19]

Nomaki et al.

[11] 3,744,844
[45] July 10, 1973

[54] ADJUSTABLE SEAT HAVING A HYDRO-PNEUMATIC SPRING MECHANISM

[75] Inventors: Masaaki Nomaki; Norimi Hozumi; Mizuo Otaki; Kenichi Maemori, all of Atsugi; Shoju Sakai, Yokohama, all of Japan

[73] Assignees: Nissan Motor Company, Limited, Yokohama; Atsugi Motor Parts Company, Limited, Atsugi; Ikeda Bussan Company, Limited, Yokohama, all of Japan

[22] Filed: June 24, 1971

[21] Appl. No.: 156,355

[30] Foreign Application Priority Data
July 24, 1970 Japan................................ 45/73533
July 24, 1970 Japan................................ 45/73534
Dec. 28, 1970 Japan............................. 45/132643
Dec. 28, 1970 Japan............................. 45/132644

[52] U.S. Cl. ............................................... 297/355
[51] Int. Cl. ............................................. A47c 1/024
[58] Field of Search...................... 297/374, 375, 355; 248/412, 161, 404

[56] References Cited
UNITED STATES PATENTS

| | | | |
|---|---|---|---|
| 3,407,909 | 10/1968 | Seckerson | 297/355 |
| 3,477,550 | 11/1969 | Suzuki | 297/355 |
| 3,533,658 | 10/1970 | Gropp | 297/355 |
| 3,656,593 | 4/1972 | Bauer | 297/355 |

Primary Examiner—Francis K. Zugel
Attorney—Robert E. Burns et al.

[57] ABSTRACT

An adjustable seat having a hydro-pneumatic spring mechanism which includes a cylinder connected to a seat back, a piston axially slidable in the cylinder, a piston rod projecting forwardly from the piston and connected to a seat structure and a valve connected to the piston rod to operatively engage with the piston. The cylinder has formed in its cylinder bore a gas compartment filled with a gas under pressure and a liquid compartment in which the piston and the valve are located. The cylinder together with the piston is rotatable relative to the piston rod through threads formed on the connecting portions of the piston and the piston rod, causing the cylinder to axially move relative to the seat so that the seat back is angularly moved between upright and reclining positions. Arrangements may be made to prevent the piston from being over-screwed and consequently sticking to the piston rod due to application of excess torque to the cylinder. Such arrangements include means to limit the angle of rotation of the cylinder or means to cause the valve to be deformed elastically when depressed by the piston.

18 Claims, 12 Drawing Figures

PATENTED JUL 10 1973

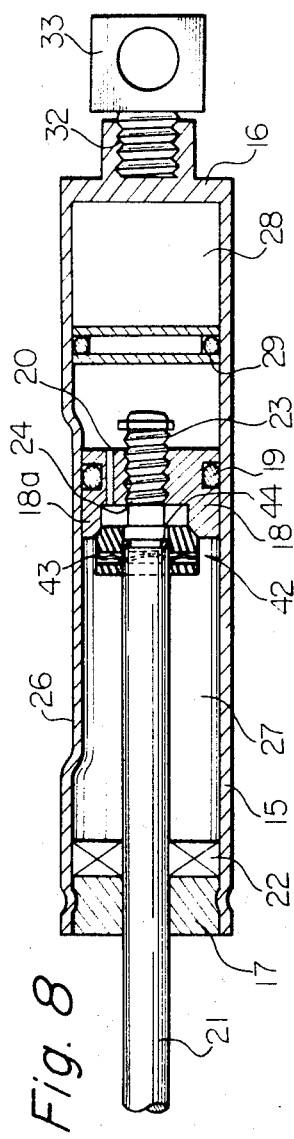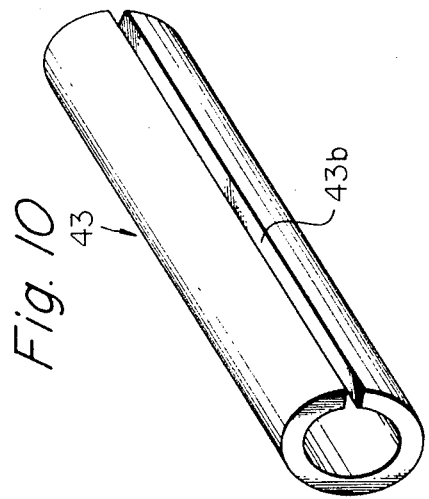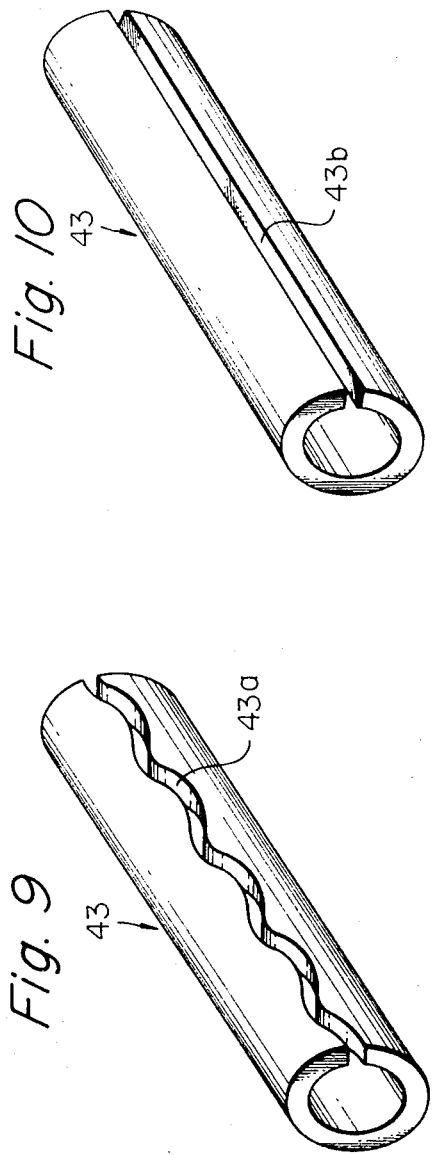

ADJUSTABLE SEAT HAVING A HYDRO-PNEUMATIC SPRING MECHANISM

This invention relates generally to adjustable seats having tiltable backs and has a particular reference to hydro-pneumatic lock mechanisms providing control over the angular position of the seal back of the adjustable seats.

The adjustable seat commonly comprises a seat structure to support a seat occupant thereon, a seat back which is tiltably mounted on the seat structure, a pivotal support member secured to the seat back to angularly move it forwardly or backwardly, and an adjustable lock device mounted on the seat structure to lock and unlock the seat back at an angle selected by the seat occupant. The adjustable lock device usually includes a rack and pinion arrangement which is adapted to move the seat back pivotally relative to the seat structure. The rack and pinion arrangement is subject to wear and abrasion in its engaging or sliding portions during use of the adjustable seat so that the lock device sometimes fails to smoothly operate after the lock device has been used for a prolonged period of time. The lock device is also provided with a mechanical stop member or a ratchet mechanism to hold its locked condition and, as a result, the angular position of the seat back can not be varied steplessly.

An important object of this invention is, therefore, to provide an adjustable seat having a hydro-pneumatic spring mechanism by which the angular position of the tiltable seat can be varied smoothly and steplessly by the aid of a compressible gas and an incompressible liquid.

According to a first outstanding aspect of this invention to achieve this object, the hydro-pneumatic spring mechanism of the adjustable seat is generally made up of a cylinder connected to a tiltable seat back of the seat, a piston which is axially slidable in the cylinder bore, a piston rod projecting forwardly from the piston through one end wall of the cylinder and connected to a seat structure of the seat and a valve member connected to the piston rod to operatively engage with the piston. The cylinder has formed in its cylinder bore a gas compartment which is filled with a pressurized gas and a liquid compartment which is filled with a suitable liquid such as oil and in which the piston and the valve member are accommodated. The two compartments are separated from each other by suitable partition means such as a floating piston. The cylinder is rotatable together with the piston relative to the piston rod through threads by which the piston and the piston rod are connected together whereby the cylinder is caused to move axially to have the seat back turned angularly in a forward or rearward direction. When the cylinder is in an angular position to provide the locked condition, the piston and accordingly the cylinder are held stationary against the pressure exerted by the pressurized gas in the gas compartment. When, on the other hand, the cylinder is rotated to a position providing the unlocked condition, the piston is now forced away from the gas compartment by the pressure from the gas compartment with the result that the cylinder and the piston as well are moved backwardly relative to the piston rod. Rotation of the cylinder relative to the piston rod is effected by manipulation of an adjustment lever which is mounted on the hydro-pneumatic spring mechanism.

It is, in this instance, important that the cylinder be rotated with an adequate torque so that the piston is turned smoothly on the threads by which the piston and the piston rod are connected together. If, however, an excess torque is applied to the cylinder and accordingly to the piston when the cylinder is rotated to its unlocked condition by lever manipulation, then it will happen that the piston rod is over-screwed into the piston so that the piston and the piston rod are caused to stiffly stick to each other, resulting in an inability of the cylinder being rotated in either direction. The hydro-pneumatic spring mechanism may thus be made inoperable with the result that the tiltable seat back is now fixedly locked.

The lock cylinder has locked and unlocked conditions depending upon the angular position about its axis and, if desired, a spring means may be provided to bias the cylinder to the locked condition. If, thus, the excess torque is applied to the cylinder, it is transferred to the spring means which consequently is liable to be damaged or impaired during use.

It is, therefore, another important object of this invention to provide an adjustable seat having an improved hydro-pneumatic spring mechanism which is freed from this problem and which is capable of operating reliably to permit the tiltable seat back to be angularly moved in a satisfactory condition. The hydro-pneumatic spring mechanism is thus adapted to prevent the cylinder from being subjected to an excess torque when the cylinder is rotated to its unlocked condition whereby the piston is prevented from stiffly sticking to the piston rod and the spring means associated with the cylinder is protected from being damaged or destroyed.

The cylinder should be urged to its locked condition with an adequate torque. If an excess torque is applied to the cylinder for one reason or another, then a disproportionate opposing force will be encountered when rotating the cylinder to the unlocked condition and the seat occupant will be given a feeling of insecurity when the cylinder is being moved from the unlocked position to the locked position.

Thus, still another important object of this invention is to provide an adjustable seat having an improved hydro-pneumatic spring mechanism in which application of an excess torque to the cylinder in biasing the cylinder to its locked condition is prevented thereby to have the operation of the spring mechanism considerably streamlined and to provide the seat occupant a feeling of control over the operation of the spring mechanism.

To provide a streamlined adjustment of the angular position of the tiltable seat back, it will be desired that the adjustment lever for positively rotating the cylinder against the opposing action of the spring means have a large working length. Where the adjustable seat having the hydro-pneumatic spring mechanism is used in a limited space as in a motor vehicle, provision of the adjustment lever having such large working length is apparently not advisable and, as such, an alternative expedient may preferably be provided to streamline the adjustment of the angular position of the tiltable seat back.

This invention thus has still another object which is to provide an adjustable seat having an improved hydro-pneumatic spring mechanism which includes means adapted to minimize a frictional force applied to the cylinder when the cylinder is rotated in a direction to establish the unlocked condition.

According to a second outstanding aspect of this invention, the hydro-pneumatic spring mechanism of the described construction may be provided with means which is adapted to limit the angle of rotation of the cylinder in both direction. Such means may include a pair of spaced coupling limbs projecting from the rearmost end of a portion of the adjustment lever riding on the outer peripheral wall of the cylinder. The coupling limbs are spaced from each other a distance suitably greater than the thickness of a pivotal support member by which the cylinder is supported at its rearmost end to the tiltable seat back and are positioned in a manner to have the lower end portion of the pivotal support member interposed therebetween. The coupling limbs are rotatable together with the cylinder about an axis of the cylinder and either of the limbs is thus brought into abutting engagement at its inner edge with the pivotal support member when the adjustment lever is moved.

According to a third outstanding aspect of this invention, the hydro-pneumatic spring mechanism may be provided, as an alternative to the aforesaid means to limit the angle of rotation of the cylinder, with means which is adapted not only to limit such angle but to elastically absorb a portion of an excess torque which would otherwise applied to the cylinder when the adjustment lever is moved excessively to move the cylinder to its unlocked position. Such means may include a bifurcated member which is secured to a rear end portion of the cylinder and which has a pair of spaced limbs directed substantially perpendicularly to the axis of the cylinder. In this instance, the adjustment lever should be modified to comprise a grip portion located adjacent the cylinder, an upright portion merging from the grip portion and directed substantially perpendicularly to the axis of the cylinder, a curved or bent portion merging from the upright portion and extending over the outer peripheral wall of the cylinder, and a substantially straight portion merging from the curved or bent portion and extending in a direction approximately parallel to the axis of the cylinder. The upright portion terminates at a predetermined spacing from the outer peripheral wall of the cylinder. The straight portion is pivotally connected at its leading end to the pivotal support of the tiltable seat back and is loosely interposed between the limbs of the bifurcated member. With this arrangement, rotation of the cylinder to establish the unlocked condition is effected through engagement of the straight portion of the adjustment lever and one of the limbs of the bifurcated member when the adjustment lever is depressed at its grip portion toward the cylinder.

According to a fourth outstanding aspect of this invention, the hydro-pneumatic spring mechanism may be provided, as a further alternative, with means which is adapted to permit the valve member seated on the piston to be deformed axially when an excess driving force is transferred to the valve member through the cylinder and the piston, whereby the excess driving force is consumed in the deformation of the valve member. The valve member suited for this purpose should be made of a suitable resilient member so as to be deformed appropriately. The means of this character may comprise a cotter which is inserted into aligned holes formed in the valve member and the piston rod in a direction substantially at right angles to the axis of the cylinder. Or otherwise, such means may comprise at least one spring washer which is mounted on the forward end face of the valve member through a stepped portion of the piston rod. In this instance, this forward end face should be formed with a circular depression having a diameter which is larger than the diameter of the piston rod and smaller than the outside diameter of the spring washer so that the valve is normally in contact with the spring washer at its raised outer peripheral edge.

According to a fifth outstanding aspect of this invention, the hydro-pneumatic spring mechanism may be provided, in addition to any of the aforesaid means adapted to prevent the piston from stiffly sticking to the piston rod, with means which is capable of eliminating a frictional force which would be otherwise applied to the cylinder when the cylinder is protruded by the thrust resulting from the pressure in its gas compartment. The cylinder is usually connected pivotally to the pivotal support member of the tiltable seat back through a threaded joint. The threaded joint is secured at one end to the pivotal support member and connected at the other end to a rearmost end wall of the cylinder through internal threads formed in the end wall to permit the cylinder to rotate relative to the pivotal support member. When the cylinder is rotated to be moved to its unlocked condition, therefore, friction is caused between the threaded joint and the internal threads in the end wall of the cylinder due to a thrust resulting from the pressure from the gas compartment, producing an opposing effort to the movement of the cylinder. This frictional force is eliminated, according to this invention, through provision of the means which includes a cup-shaped member mounted on the end wall of the cylinder and having an open end, a ball positioned in the cup-shaped member, a ball seat means mounted on the end wall of the cylinder, a ball retainer having a central recess in which the ball is retained and abuts to the ball seat means, and a rigid bushing securing the ball retainer in position to the cup-shaped member. The ball retainer is connected to the threaded joint to have the cylinder rotatably connected to the pivotal support member through the thus constructed intermediate means. The threaded joint is in this manner connected to the cylinder through a point contact of the ball.

Other objects, features and advantages of the adjustable seat having the hydro-pneumatic spring mechanism herein disclosed will become more apparent from the following description of different embodiments of the invention, reference being made to the accompanying drawings in which like reference numerals and characters are assigned to corresponding parts and elements and in which:

FIG. 8 is a longitudinal sectional view showing a third modification of the hydro-pneumatic lock mechanism;

FIGS. 9 and 10 are perspective views showing different examples of cotters for use in the spring mechanism of FIG. 8;

Figure 1:
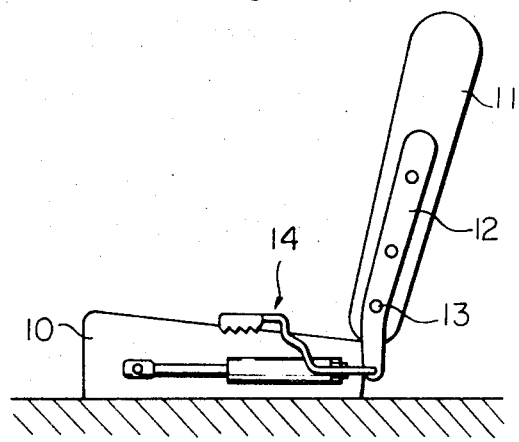
FIG. 1 is a side elevation of an overall construction of an adjustable seat having the hydro-pneumatic spring mechanism in accordance with this invention is mounted.

Referring to the drawings and first to FIG. 1, an adjustable seat is shown comprising a seat structure 10, a seat back 11 which is tiltably mounted on the seat structure and a pivotal support member 12 secured to the seat back to angularly move the seat back forwardly or backwardly about an axis 13 of rotation. A hydro-pneumatic spring mechanism, generally represented by reference numeral 14, is mounted on the adjustable seat thus constructed so as to lock and unlock the seat back 11 as desired by a seat occupant.

Figure 2:
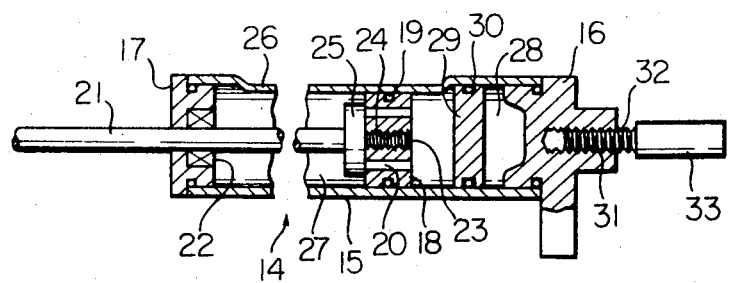
FIG. 2 is a longitudinal sectional view showing a detailed construction of the hydro-pneumatic spring mechanism of the adjustable seat shown in FIG. 1.

A detailed construction of the hydro-pneumatic spring mechanism 14 forming part of the adjustable seat of this invention is illustrated in FIG. 2. As shown, the hydro-pneumatic spring mechanism 14 comprises a cylinder 15 which is closed at one end by an end wall 16 and at the opposite end by an annular end plug 17 fitted within the cylinder bore. The cylinder 15 includes a piston 18 mounted in the cylinder bore with a sealing ring 19 fitted in an annular groove formed on the outer peripheral wall of the piston. The piston 18 has formed therein a passage 20 extending from one end of the piston to the other in a direction substantially parallel to the axis of the cylinder 15. A piston rod 21 projects from the piston 18 and extends outwardly of the cylinder through the annular end plug 17. The piston rod 21 is connected to the seat structure 10 (FIG. 1), thus being held stationary. Denoted by reference numeral 22 is a sealing ring which is mounted between the aperture in the annular end plug 17 and the piston rod 21. The piston rod 21 has its inner end portion 23 threaded to engage with the piston 18 through an internally threaded bore 24 in the piston, permitting the piston to rotate relative to the piston rod. A valve member 25 is mounted on the piston rod 21 and is seated on a forward end face of the piston 18. The valve member 25 is so configured as to close and open the passage 20 of the piston 18 as the piston is rotated relative to the piston rod 21 and accordingly to the valve member 25. The piston 18 is arranged to be axially movable in the cylinder bore but is prevented, from rotating about its axis by means of a suitably deformed portion 26 of the cylinder 15. The cylinder 15 is internally divided into two compartments 27 and 28 by suitable partition means such as for example a floating piston 29 which is axially movable in the cylinder bore. Between the cylinder and the floating piston 29 is mounted a sealing ring 30. The compartment 27 defined by the annular end plug 17 and a forward end face of the floating piston 29 is filled with suitable liquid and the piston 18 and the valve 25 are accommodated in this compartment 27 which is now called the liquid compartment. The compartment 28 defined by the closed end wall 16 of the cylinder 15 and a rearward end face of the floating piston 29 is filled with a gas under pressure, the compartment 28 thus being called the gas compartment. The cylinder 15 has formed in its closed end wall 16 an internally threaded bore 31 and is connected therethrough a threaded end portion 32 of a connecting rod 33. The connecting rod 33 is pivotally connected to the pivotal support member 12 (FIG. 1) as will be discussed later.

The cylinder 15 and accordingly the piston 18 are thus rotatable about their axes relatively to the piston rod 21 and to the connecting rod 33 through threaded engagement therebetween. When the cylinder 15 is in an angular position in which the valve member 25 opens the passage 20 in the piston 18, the spaces on both sides of the piston 18 in the liquid compartment 27 are permitted to communicate with each other so that the piston 18 is urged toward the annular end plug 17 by a pressure exerted from the gas compartment 28 through the liquid in the compartment 27 on the rearward side of the piston 18. The cylinder 15 is thus moved axially rearwardly toward the connecting rod 33, moving the seat back 12 to its upright position (FIG. 1). This condition of the cylinder 15 is herein called the unlocked condition. When, on the other hand the cylinder 15 and accordingly the piston 18 are rotated about their axes relatively to the piston rod 21 and the connecting rod 33 through threaded engagement therebetween and assume an angular position in which the passage 20 in the piston 18 is closed by the valve member 25, then the communication between the spaces on both sides of the piston 18 is blocked so that the cylinder 15 and the piston 18 are held stationary relative to the piston rod 21 and the connecting rod 33, holding the seat back 12 stationary in selected angular position (FIG. 1). This condition of the cylinder 15 is called the locked condition.

The pressurized gas to be contained in the gas compartment 28 may be a nitrogen gas which is advantageous for its safety in handling reasonable cost and commercial availability as a compressed gas.

Figures 3, 4:
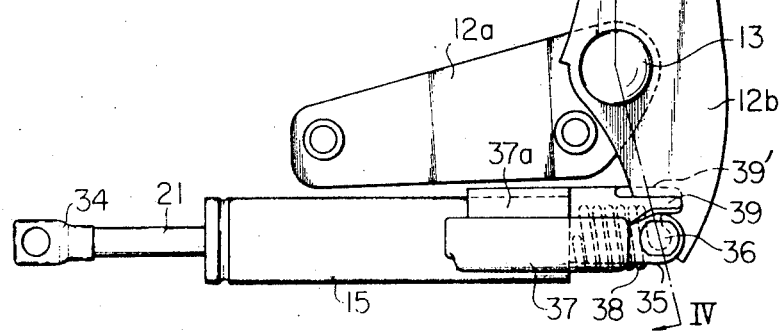
FIG. 3 is a side elevation, on an enlarged scale of a first modification of the hydro-pneumatic spring mechanism.
FIG. 4 is a section on line IV—IV of FIG. 3.
Figure 5:
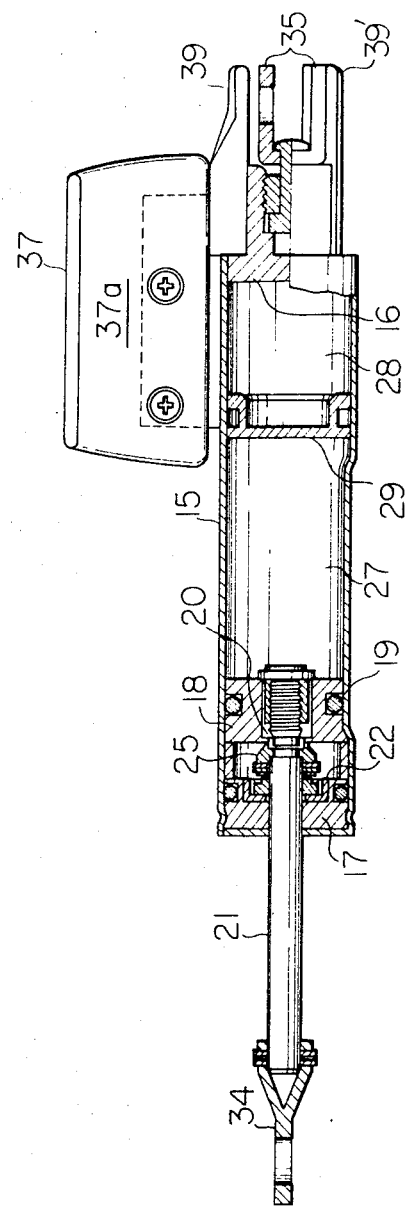
FIG. 5 is a longitudinal sectional view, on a further enlarged scale, of essential parts of the mechanism shown in FIGS. 3 and 4.

Reference is now made to FIGS. 3 to 5 showing a first modification of the hydro-pneumatic spring mechanism of the adjustable seat according to this invention. As illustrated, the pivotal support member 12 has a bracket 12a connected to the seat structure 10 (FIG. 1) so that the member 12 is rotatable about the pivotal shaft 13. The piston rod 21 is connected at its forward end to the seat structure through suitable coupling means such as a connecting eye member 34, while the connecting rod 33 is pivotally connected at its rearward end to a lower end portion 12b of the pivotal support member 12 through suitable pivotal means such as a connecting eye member 35 which is pivotally mounted on a stud 36. Rotation of the cylinder 15 to the above defined unlocked condition is effected through manipulation of an adjustment lever 37 which is connected securely to the cylinder 15 through a rounded portion 37a as best seen in FIG. 4. A spring means 38 is connected at one end to this adjustment lever 37 and at the opposite end to the stud 36, whereby the adjustment lever 37 and accordingly the cylinder 15 are biased to the above defined locked condition.

If an excess torque is imparted to the cylinder 15 and accordingly to the piston 18 when the adjustment lever 37 is moved forcefully to establish the unlocked condition of the cylinder, the piston rod 21 tends to be over-screwed into the threaded bore 24 in the piston 18 with the result that the piston 18 and the piston rod 21 are caused to stiffly stick together preventing the cylinder 15 from moving any longer and/or causing the spring means 38 to be broken or damaged. If, on the other hand, the cylinder 15 is urged to its locked condition too forcefully for one reason or another, then a disproportionate opposing effort will be experienced when moving the adjustment lever 37 to establish the unlocked condition. To avoid these difficulties, arrangement is now made on the hydro-pneumatic lock mechanism of the shown construction so as to limit the angle of rotation of the cylinder 15. Such arrangement comprises a pair of spaced limbs 39 and 39' projecting from the rounded portion 37a of the adjustment lever 37 riding on the outer peripheral wall of the cylinder 15. The coupling limbs 39 and 39' are spaced from each other a distance suitably greater than the thickness of the lower end portion 12b of the pivotal support member 12 and are positioned to the lower end portion 12b interposed therebetween. The coupling limbs 39 and 39' are thus rotatable with the cylinder 15 about the axis of the cylinder. Such rotation of the limbs is limited by the lower end portion 12b of the support member 12 through engagement of either of the coupling limbs 39 and 39'. When the adjustment lever 37 is moved manually to provide the unlocked condition or automatically to provide the locked condition by the action of the spring means 38, the limb 39 or 39' is brought into abutting engagement at its inner edge with either side of the lower end portion 12 b of the support member 12 so that the limbs 39 and 39' and accordingly the adjustment lever 37 are prevented from being rotated any longer. The cylinder 15 is in this manner prevented from excessive rotation which would otherwise result in an excess torque applied to the piston 18 or in an excess opposing effort to the rotation of the cylinder 15 to the unlocked condition. The coupling limbs 39 and 39' may form part of a unitary bifurcated member as shown or may be formed as separate members.

Figure 6:
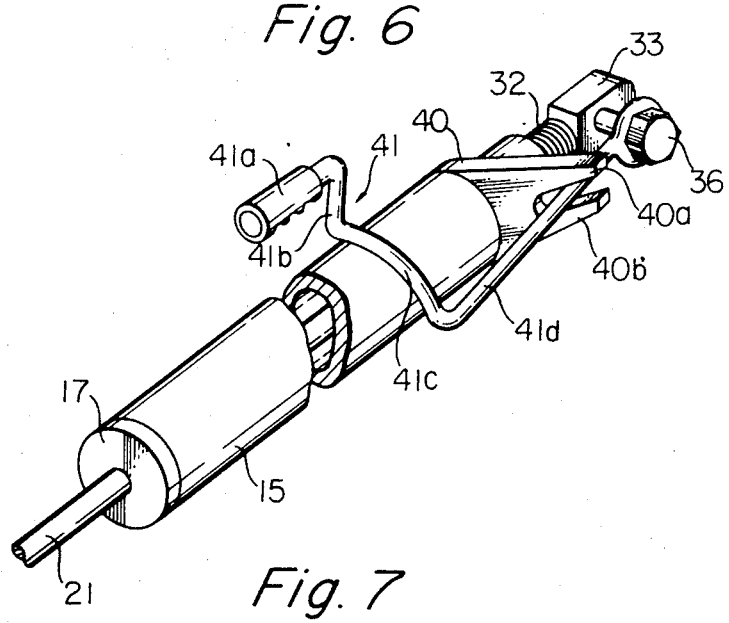
FIG. 6 is a perspective view, partially cut away of a second modification of the hydro-pneumatic spring mechanism.
Figure 7:
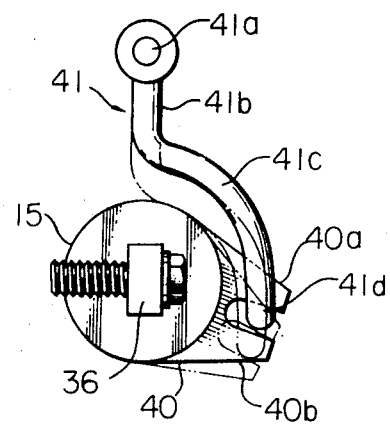
FIG. 7 is a rear end view of the spring mechanism of FIG. 6.

FIGS. 6 and 7 illustrate another modification of the hydro-pneumatic spring mechanism of the adjustable seat according to this invention. The shown embodiment is now adapted not only to limit the angle of rotation of the cylinder 15 but to elastically dampen the excess torque to be otherwise transferred to the cylinder. In the embodiment herein shown, a bifurcated member 40 having spaced limbs 40a and 40b is mounted securely on the closed end wall 16 of the cylinder 15, with the limbs 40a and 40b extending substantially perpendicularly to the axis of the cylinder 15. The bifurcated member 40 is associated with a modified form of adjustment lever which is now designated by reference numeral 41. The adjustment lever 41 consists of a grip portion 41a located adjacent the cylinder 15, an upright portion 41b merging from the grip portion 41a and directed substantially at a right angle to the axis of the cylinder 15, a curved or bent portion 41c merging from the upright portion 41b and extending over the outer peripheral surface of the cylinder 15, and a substantially straight portion 41d merging from the curved or bent portion 41c and extending in a direction substantially parallel to the axis of the cylinder 15. The upright portion 41b terminates at a predetermined spacing from the outer peripheral surface of the cylinder 15. The straight portion 41d is pivotally connected to the lower end portion 12b of the pivotal support member 12 through the stud 36 and is loosely interposed between the limbs 40a and 40b of the bifurcated member 40. With this arrangement, rotation of the cylinder 15 to establish the unlocked condition of the cylinder 15 is effected by moving the grip portion 41a of the lever 41 toward the cylinder 15 so that the lever is rotated about the stud 36 to rotate the bifurcated member 40 through abutting engagement between one of the limbs 40a and 40b and the straight portion 41d of the lever 41. If, in doing so, the adjustment lever 41 is depressed too forcefully toward the cylinder 15, not only the lever 41 is warped especially at its curved or bent portion 41c and straight portion 41d so as to dampen a portion of the excess force but also the displacement of the adjustment lever 41 is limited by abutting engagement between the lower end of the upright portion 41b of the lever and the outer peripheral surface of the cylinder 15. The spacing between the lower end of the upright portion 41b and the outer peripheral surface of the cylinder 15 should be determined in relation to the spacing between the limbs of the bifurcated member and to an operating torque which is required to smoothly rotate the cylinder 15 against the action of the spring means 38. When, moreover, the adjustment lever 41 is released and the cylinder 15 is rotated by the action of the spring means 38 so as to restore the locked condition the rotation of the cylinder 15 is limited by the engagement between the other of the limbs 40a and 40b of the bifurcated member 40 and the straight portion 41d of the lever 41. The angle of rotation of the cylinder in both directions can be limited and a portion of the excess force otherwise transferred to the cylinder is dampened in this manner.

A third modification of the hydro-pneumatic spring mechanism of the adjustable seat according to this invention is illustrated in FIG. 8, arrangement is made so as to permit the valve member to be deformed axially when an excess driving force is transferred thereto through the cylinder and piston whereby the excess force is dampened. A modification is thus incorporated in the valve member which is therefore designated by new reference numeral 42. This valve member 42 is made of a resilient material and has formed therein a hole (not numbered) extending at right angles to the axis of the cylinder 15. The valve 42 is mounted on the piston rod 21 in which a hole (not numbered) is formed in alignment with the hole in the valve member 42. A cotter means 43 is inserted into the thus aligned holes in the valve member 42 and the piston rod 21. In this instance, the piston 18 is so configured as to have an annular extension 18a forming a valve seat for the valve member 42. The valve member 42 is thus in contact with the piston through this annular extension. When, now, an excess driving force is transferred to the valve member 42 through the cylinder 15 and the piston 18, the valve member 42 made of a resilient material and the cotter means 43 are deformed toward the annular end plug 17 through engagement between the inner face of the valve member 42 and the annular extension 18a so that the excess driving force is damped to save the piston 18 from being cause to stick to the piston rod 21 at their threaded portions. If desired, a sealing ring 44 may be mounted between the piston rod 21 and the valve member 42 to prevent passage of the liquid therethrough.

Examples of the cotter means 43 are illustrated in FIGS. 9 and 10, wherein the cotter means comprises a hollow cylindrical member having formed therein a slot extending longitudinally of the cylindrical member. This slot may be a meandering slot 43a as shown in FIG. 9 or an elongated straight slot 43b as shown in FIG. 10

Figure 11:
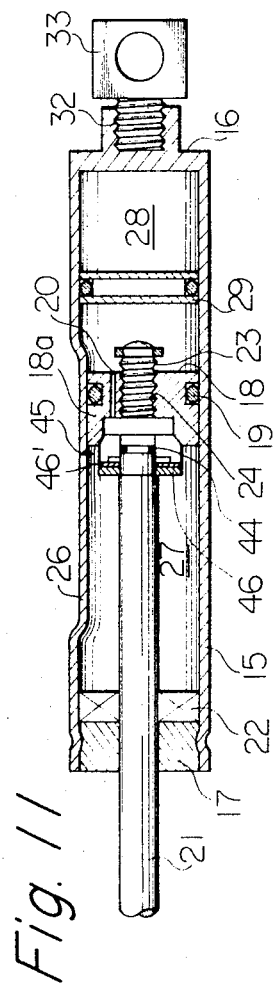
FIG. 11 is similar to FIG. 8 but shows a further modification of the spring mechanism shown therein.

FIG. 11 illustrates a further modification of the mechanism of FIG. 8, now constructed to achieve a common purpose. The piston rod 21 in this instance is provided with a stepped or reduced portion (not numbered) on which the valve member is mounted. The valve member, now designated by reference numeral 45, is made of a resilient material and has mounted on its outer face at least one spring washer 46. The number of the spring washer may be selected depending upon the specific requirements of the lock mechanism. The piston 18 is constructed similarly to the piston in the preceding embodiment and has an annular extension 18a forming a valve seat for the valve member 45. A sealing ring 44 may also be mounted between the piston rod 21 and the valve member 45, if desired. The excess driving force transferred to the valve member 45 thus constructed is dampened by means of elastic deformation of the valve member 45 and the spring washer 46 through engagement between the inner face of the valve member and the annular extension 18a of the piston.

If preferred, the spring washer 46 may be supported by a collar mounted on the piston rod 21 by means of a knock pin in lieu of provision of the stepped or reduced portion of the rod 21.

Figure 12:
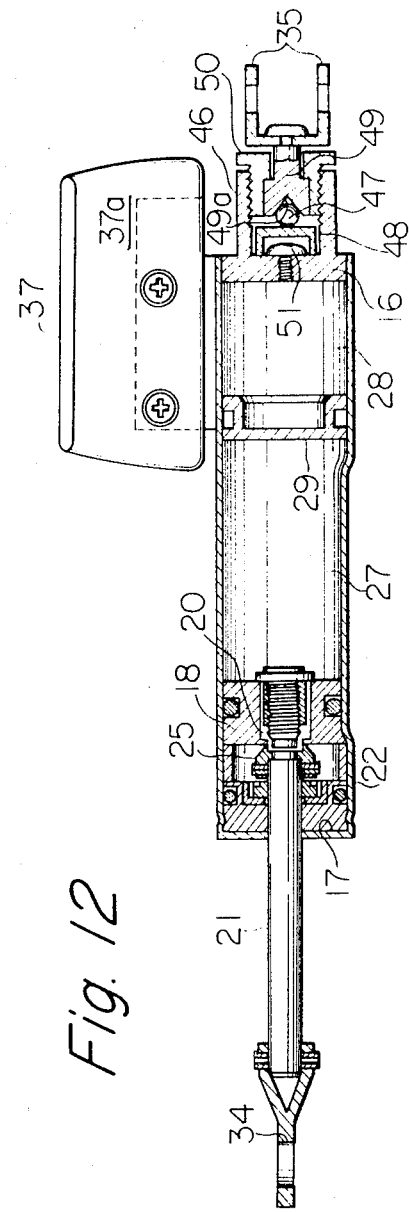
FIG. 12 is a longitudinal sectional view showing a fourth modification of the hydro-pneumatic spring mechanism.

A fourth modification of the hydro-pneumatic spring mechanism of the adjustable seat according to this invention is illustrated in FIG. 12 in which arrangement is made so as to eliminate frictional force to be otherwise built up between the internally threaded bore 31 and the threaded end portion 32 of the connecting rod 33 when the cylinder 15 is protruded forward the connecting rod by the thrust resulting from the pressure in the gas compartment 28 (FIG. 2).

Referring to FIG. 12, such arrangement is provided between the closed end wall 16 of the cylinder 16 and the forward end of the connecting eye member 35. The arrangement includes a cup-shaped member 46 mounted on the closed end wall 16 of the cylinder 15 to have its open end directed rearwardly. A ball member 47 of a selected diameter is positioned in the cup-shaped member 46 and seated on a ball seat means 48 which is fast on the end face of the wall 16. The ball member 47 is pressed upon the ball seat means 48 by a ball retainer 49 having formed in its inner wall a recess 49a in which the ball member 47 is captured and prevented from being dislocated. The ball retainer 49 is held stationary relative to the cup-shaped member 46 by suitable connecting means such as a rigid bushing 50 to which the ball retainer is fastened and which, in turn, is screwed or welded to the cup-shaped member 46. The ball retainer 49 is securely connected to the connecting eye member 35.

The ball seat 48 may be integral with a gas inlet plug 51 which is usually mounted on the end wall 16 of the cylinder to supply a pressurized gas into the gas compartment 28. The ball member 47 and the ball seat 48 and the ball retainer 49 as well may preferably be made of a rigid, abrasion-free and easy-to-slip material so that the connecting eye member 35 is connected to the cylinder 15 through a point contact between the ball member and ball seat. Such point contact contributes to reducing the opposing force to the rotation of the cylinder 15 resulting from the thrust on the cylinder when the cylinder is moved toward the connecting rod 33.

It should now be borne in mind that the hydro-pneumatic spring mechanism as heretofore been described with reference to the accompanying drawings can be utilized not only for the adjustable seats but for various other devices and apparatus insofar as the angular position of given members are to be varied steplessly.

What is claimed is:

1. An adjustable seat comprising: a seat structure, a seat back tiltably mounted on said seat structure, a pivot support member secured to said seat back to permit angular movement of the seat back forwardly or backwardly relative to said seat structure, and a hydro-pneumatic spring mechanism interconnecting said seat back and said pivotal support member comprising a cylinder closed at one end by an end wall and at the opposite end by an annular end plug, a piston slidable in said cylinder and having means therein defining a passage extending from one face of the piston to the other, a piston rod projecting from said piston and connected at its forward end to said seat structure through said annular end plug, said piston being rotatably connected to said piston rod relative to the piston rod, a valve member mounted on said piston rod and seated on an outer face of said piston and configured to close and open said passage as said piston is rotated with said cylinder relatively to said piston rod, partition means axially slidably mounted in said cylinder to divide the cylinder bore into a gas compartment filled with a pressurized gas and a liquid compartment filled with a liquid and accommodating therein said piston and said valve member, a connecting rod to which said cylinder is rotatably connected through said end wall and which is pivotally connected to said pivotal support member, spring means biasing said cylinder to a locked condition, an adjustment lever connected to said cylinder for rotating said cylinder to an unlocked condition against the action of said spring means, and means for preventing said valve member from stiffly seating on the outer face of said piston when said cylinder is rotated to the locked condition.

2. An adjustable seat as claimed in claim 1, in which said pressurized gas is a nitrogen gas under pressure.

3. An adjustable seat as claimed in claim 1, wherein said last named means comprises a pair or spaced limbs projecting from said adjustment lever and rotatable with said cylinder as said adjustment lever is moved, and a member interposed between said limbs and disposed stationary in a direction parallel to said limbs.

4. An adjustable seat as claimed in claim 1, wherein said last named means includes a bifurcated member having spaced limbs and mounted securely on said end wall of said cylinder with said limbs extending substantially perpendicularly to an axis of said cylinder and wherein said adjustment lever comprises a grip portion located adjacent said cylinder, an upright portion merging from said grip portion and directed substantially at a right angle to said cylinder, said upright portion terminating at a predetermined spacing from an outer peripheral surface of said cylinder, a curved or bent portion merging from said upright portion and extending over the outer peripheral surface of said cylinder, and a straight portion merging from said curved or bent portion and extending in a direction substantially parallel to said axis of the cylinder, said straight portion being pivotally connected at its leading end to a pivotal stud and loosely interposed between said spaced limbs.

5. An adjustable seat as claimed in claim 4, wherein said spacing is predetermined in relation to the spacing between said limbs and an operating torque to be required to smoothly rotate said cylinder and piston relatively to said piston rod.

6. An adjustable seat as claimed in claim 1, wherein said means comprise resilient means connecting said valve member to said piston rod so as to permit said valve member to be deformed toward said annular end wall when an excess driving force is transferred to the valve member through said cylinder to forcefully press said piston against said piston rod.

7. An adjustable seat as claimed in claim 6, wherein said piston has an annular projection directed toward said valve member to abut against an inner face of said valve member.

8. An adjustable seat as claimed in claim 6, wherein a sealing ring is mounted between said valve member and said piston.

9. An adjustable seat as claimed in claim 7, wherein said resilient means comprises means inserted into said valve member and said piston rod through aligned holes formed therein at substantially right angles to the axis of said cylinder.

10. An adjustable seat as claimed in claim 9, wherein said last-mentioned means includes a hollow cylindrical member having formed therein a slot extending longitudinally throughout said cylindrical member.

11. An adjustable seat as claimed in claim 10, wherein said slot is meandering from one end of said cylindrical member to the other.

12. An adjustable seat as claimed in claim 10, wherein said slot is formed straight.

13. An adjustable seat as claimed in claim 6, wherein said resilient means comprises at least one spring washer mounted on an outer face of said valve member.

14. An adjustable seat as claimed in claim 13, wherein said spring washer is connected to said valve member through a reduced portion of said piston rod.

15. An adjustable seat as claimed in claim 13, wherein said spring washer is connected to said valve member by a collar mounted on said piston rod through a knock pin.

16. An adjustable seat as claimed in claim 1 further comprising a cup-shaped member securely mounted on said end wall of the cylinder to have its open end directed axially outwardly, a ball member positioned in said cup-shaped member, ball seat means fast on said end wall and on which said ball member is seated, and a ball retainer interposed in said cup-shaped member and having formed in its inner wall a recess for capturing said ball member therein, said ball retainer being connected to said pivotal member.

17. An adjustable seat as claimed in claim 16, wherein said ball seat means are made of a rigid, abrasion-free and easy-to-slip material.

18. An adjustable seat as claimed in claim 16, wherein said ball seat means is integral with a gas inlet plug mounted on said end wall.

* * * * *